United States Patent [19]

Eyerly et al.

[11] Patent Number: 6,076,772
[45] Date of Patent: Jun. 20, 2000

[54] METHODS FOR CONTROLLING SPACECRAFT ATTITUDES WITHOUT EXCITING SPACECRAFT RESONANCES

[75] Inventors: Bruce N. Eyerly, Torrance; David S. Uetrecht, Palos Verdes, both of Calif.

[73] Assignee: Hughes Electronics Corporation, El Segundo, Calif.

[21] Appl. No.: 08/990,709

[22] Filed: Dec. 15, 1997

[51] Int. Cl.$^7$ .................................................. B64G 1/24
[52] U.S. Cl. ............................ 244/164; 244/165; 244/166
[58] Field of Search ..................................... 244/164–169; 701/13

[56] References Cited

U.S. PATENT DOCUMENTS

| 3,765,621 | 10/1973 | Shigehara ................................. 244/166 |
| 4,567,564 | 1/1986 | Bittner et al. ............................ 244/164 |
| 5,025,381 | 6/1991 | Goodzeit et al. ........................ 244/171 |
| 5,058,835 | 10/1991 | Goodzeit et al. ........................ 244/165 |
| 5,816,538 | 10/1999 | Challoner et al. ....................... 244/165 |

OTHER PUBLICATIONS

Shigehara, "Geomagnetic Attitude Control of an Axisymmetric Spinning Satellite" Journal of Spacecraft vol. 9 No. 6, pp391–398, Jun. 1972.

*Primary Examiner*—Galen L. Barefoot
*Attorney, Agent, or Firm*—Georgann S. Grunebach; M. W. Sales

[57] ABSTRACT

Attitude-control methods are provided which eliminate or reduce structural resonances in spacecraft that are excited by momentum wheel imperfections. The methods are preferably practiced with an over-determined attitude-control system which is typically available because spacecraft often carry backup momentum wheels to insure against failure of primary momentum wheels. In a method embodiment, a set of angular-velocity waveforms is selected that substantially realizes a commanded momentum vector when applied to a corresponding set of momentum wheels wherein none of the selected angular-velocity waveforms dwells at a resonant frequency of the spacecraft. The angular velocity of the corresponding set of momentum wheels is then conformed to the selected set of angular-velocity waveforms to realize a spacecraft attitude that corresponds to the commanded momentum vector without exciting the resonance. The step of selecting the angular-velocity waveforms can include the steps of offsetting a constant rotational frequency and of adding a velocity modulation to avoid dwelling at the resonant frequency.

35 Claims, 5 Drawing Sheets

METHODS FOR CONTROLLING SPACECRAFT ATTITUDES WITHOUT EXCITING SPACECRAFT RESONANCES

BACKGROUND OF THE INVENTION

1. Field of the Invention

The present invention relates generally to spacecraft attitude control.

2. Description of the Related Art

Spacecraft attitudes are typically controlled with attitude-control structures that are each capable of generating an individual spacecraft momentum vector. A plurality of these individual momentum vectors vectorially combine to form a composite momentum vector which urges spacecraft rotation about the composite vector.

FIG. 1 illustrates a typical body-stabilized spacecraft 20 whose attitude can be defined relative to an orthogonal coordinate system 22 that has an origin at the spacecraft's center of mass. The coordinate system 22 has a yaw axis 24 which is directed from the origin towards a point on a celestial body, e.g., the Earth 26. A pitch axis 28 is orthogonal to the spacecraft's orbital plane 30 and a roll axis 32 is aligned with the satellite's velocity vector. As the body-stabilized satellite 20 orbits the Earth 26, its yaw axis 24 typically rotates so that it is constantly directed at the Earth's center of mass.

Solar cell arrays 34 and 35 typically extend from the spacecraft so that they can rotate about the pitch axis 28 to enhance their exposure to the Sun. Antennas (e.g., the antennas 36 and 37) are usually directed towards the Earth for communication and thrusters (e.g., monopropellant, bipropellant and electrostatic) are carried on the spacecraft's body 40 to facilitate stationkeeping and attitude control. Although thrusters 42 and 43 can be carried on various body faces, they are canted from the antinadir face 44 in this exemplary spacecraft.

Positioning one of the thrusters 42 and 43 so that its thrust line is spaced from the spacecraft's center of mass and firing this thruster will generate a torque in the spacecraft 20 that urges it to rotate relative the coordinate system 22. The enlarged view of FIG. 2 illustrates that a torque can also be generated in the spacecraft 20 by appropriately positioning those spacecraft structural members which are exposed to solar radiation 50. For example, rotating the solar arrays 34 and 35 to be respectively orthogonal and parallel to the solar radiation 50 will generate a torque that urges the spacecraft 20 to rotate in the direction of the rotation arrows 52.

A magnetic torquing coil 56 can be carried in the spacecraft body 40 so that it is exposed to magnetic flux lines 58 of a celestial body (e.g., the Earth 26 of FIG. 1). Passing an electrical current through the coil 56 causes the magnetic field to generate a force on the coil that, in turn, urges the spacecraft 20 to rotate relative to the coordinate system 22.

More versatile attitude-control structures are formed with rotating members that generate angular momentum which can be oriented to produce a selected momentum vector. Increasing the angular velocity of such members imparts a torque into a spacecraft which urges it to rotate about the selected momentum vector in an angular direction opposite that of the rotating member. In contrast, decreasing the angular velocity of such members urges the spacecraft to rotate in the same angular direction as that of the rotating member.

An exemplary rotating member is a momentum wheel which typically rotates in one direction and stores momentum for accumulation (by rotating faster) or release (by rotating slower). Reaction wheels are similar to momentum wheels but rotate in both directions so that their momentum states include the zero momentum state. A momentum wheel or reaction wheel that is gimbaled to facilitate changes in its momentum direction is conventionally referred to as a control moment gyroscope. The term "momentum wheel" will hereinafter be generically used to refer to any rotating-member structure in which at least one of its momentum and its momentum direction is selectable.

In a momentum wheel set 60 of FIG. 2, momentum wheels 62, 64 and 66 are arranged to rotate respectively about the roll axis 32, the pitch axis 28 and the yaw axis 24 of the coordinate system 22. When the momentum wheel 66 rotates in the angular direction 68, it generates a momentum vector 70 that is directed along the positive yaw axis. Reversing the wheel's rotation causes a reversal of the momentum vector. If the momentum wheels 62, 64 and 66 are rotated to respectively generate the momentum vectors 72, 74 and 76 of FIG. 2, these vectors will vectorially add to a composite momentum vector 80 in the spacecraft 20. The vectorial addition is indicated by broken lines 82 which indicate orthogonal projection lines. The spacecraft 20 is thus urged to rotate about the composite momentum vector 80 in FIG. 2.

Because space is three dimensional, a minimum of three attitude-control structures is required to realize commanded momentum vectors. Three attitude-control structures form a uniquely-determined attitude-control system because there is only one unique combination of three momentum vectors that will realize a commanded momentum vector. For example, there is only one combination of angular velocities of the momentum wheels 62, 64 and 66 that generates the momentum vector 80.

In contrast, four or more attitude-control structures form an over-determined attitude-control system in which an infinite combination of momentum vectors can be found to realize a commanded momentum vector. As an example, adding a backup roll-axis momentum wheel 82 or a skew momentum wheel 84 changes the momentum wheel set 60 from a uniquely-determined attitude-control system to an over-determined attitude-control system. Because the rotational axis of the skew momentum wheel 84 is not orthogonal with any coordinate axis, it can also serve as a failure backup for any of the momentum wheels 62, 64 and 66.

Adding any other attitude-control structure (e.g., the torquing coil 56, the solar cell arrays 34 and 35 or the thrusters 42 and 43 of FIG. 1) also changes the momentum wheel set 60 from a uniquely-determined attitude-control system to an over-determined attitude-control system. Another over-determined attitude-control system 90 is shown in FIG. 3. This system has four momentum wheels 92, 94, 96 and 98 whose rotational axes are aligned along the edges of an imaginary pyramid 99 (e.g., an equilateral pyramid). An exemplary use of an over-determined attitude-control system can be found in U.S. Pat. No. 5,058,835 which is directed to momentum-wheel speed management.

Although momentum wheels are versatile attitude-control structures, they typically have imperfections (e.g., wheel imbalance, bearing flaws, and cyclic electromagnetic effects) that impart disturbance torques into a spacecraft. When the frequency of one of these disturbance torques substantially equals the frequency of a resonance in a spacecraft structure (e.g., a solar cell array or an antenna), this disturbance torque is magnified and the resulting attitude error degrades the performance of sensitive spacecraft equipment (e.g., optical sensors and multi-spectral sensors).

The probability of exciting a structural resonance is significant because momentum wheels typically exhibit a plurality of disturbance torques whose frequencies are generally proportional to the momentum wheel's speed and spacecraft structures typically exhibit a plurality of resonances. The excitation problem is further complicated because the frequencies of spacecraft resonancs are oftentimes not known.

Conventional approaches to the reduction of disturbance torques have involved the use of passive vibration-isolation platforms, ultra-precise wheel balancing, active wheel suspension techniques (e.g., with magnetic bearings) and active vibration suppression (e.g., with piezoelectric actuators). These approaches, however, are typically complex, expensive, use spacecraft weight and volume and often have limited effectiveness.

SUMMARY OF THE INVENTION

The present invention is directed to spacecraft attitude control methods which reduce spacecraft resonance effects without requiring the cost, volume and weight of additional spacecraft structures.

These goals are achieved with the recognition that over-determined attitude-control systems facilitate the realization of a commanded momentum vector (that obtains a desired spacecraft attitude) with any of an infinite number of sets of angular-velocity waveforms that are applied to the system's momentum wheels.

Thus, if an initial one of the waveforms generates a rotational frequency which produces a disturbance torque that dwells at a structural resonant frequency, it can be modified to a modified waveform that avoids dwelling at the resonant frequency. The other angular-velocity waveforms can then be revised to form, with the modified waveform, a revised set of waveforms that will realize the commanded momentum vector and not excite the spacecraft resonance.

In a method embodiment, the modified angular-velocity waveform is formed by offsetting a constant rotational frequency of the initial waveform to one that differs from the structural resonant frequency. In another method embodiment, the modified angular-velocity waveform is formed by the addition of a velocity modulation to the initial waveform. In another method embodiment, the modified angular-velocity waveform substitutes a time-changing rotational frequency at any time that the instantaneous rotational frequency of the initial angular-velocity waveform substantially equals the resonant frequency. The use of velocity modulation is particularly suited for situations in which the frequencies of spacecraft structures are not known.

Over-determined attitude-control systems can typically be formed without structural additions because spacecraft usually carry backup momentum wheels to insure against failure of primary momentum wheels. However, the teachings of the invention can also be practiced with uniquely-determined attitude-control systems. With these systems, the initial angular-velocity waveform is modified with processes similar to those described above relative to over-determined attitude-control systems. The other angular-velocity waveforms are combined with the modified waveform without revision. Accordingly, spacecraft resonances are not excited but the modified set of angular-velocity waveforms realizes a momentum vector that approximates the commanded momentum vector.

Although this latter method generates a predictable spacecraft pointing error, this may be preferable in many spacecraft applications to an unpredictable (and potentially larger) error that is caused by the excitation of a structural resonance.

The novel features of the invention are set forth with particularity in the appended claims. The invention will be best understood from the following description when read in conjunction with the accompanying drawings.

DETAILED DESCRIPTION OF THE PREFERRED EMBODIMENTS

Figure 4:
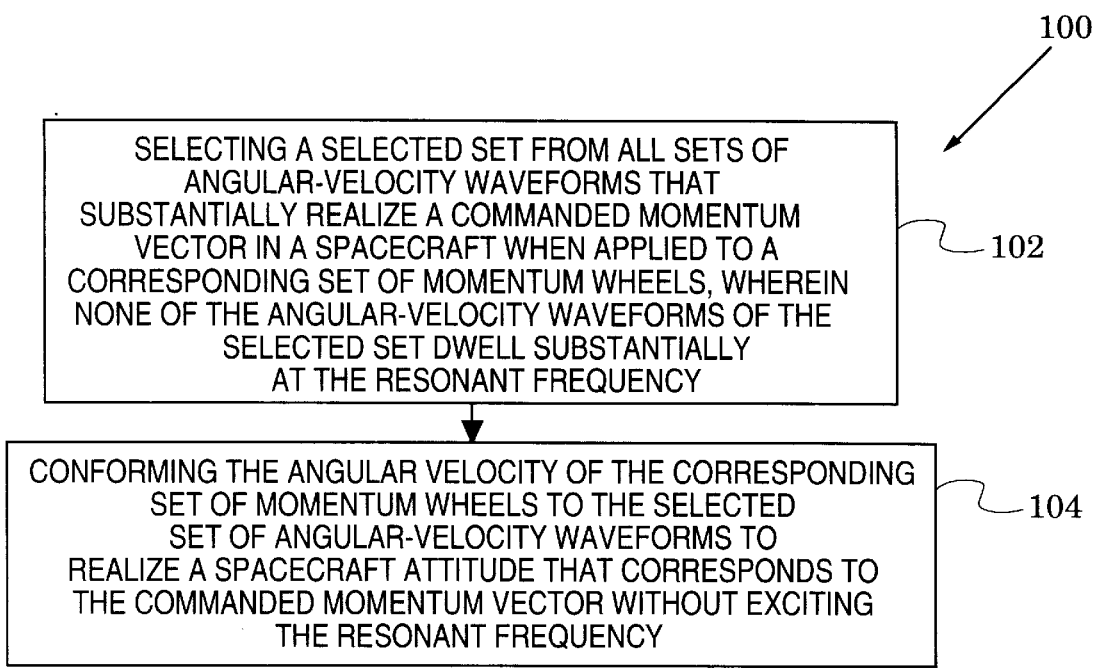
FIG. 4 is a flow chart which illustrates an attitude-control method of the present invention.

The flow chart 100 of FIG. 4 illustrates a method for controlling the attitude of a spacecraft which has a structural resonance at a resonant frequency. The method employs an over-determined attitude control system which includes momentum wheels that each rotates in accordance with a selectable, respective angular-velocity waveform.

The method begins with a process step 102 of selecting a set from all sets of angular-velocity waveforms that substantially realize a commanded momentum vector when they are applied to a corresponding set of the momentum wheels. In particular, these are the sets in which none of the angular-velocity waveforms dwell at the resonant frequency. The method concludes with the process step 104 of conforming the angular velocity of the corresponding set of momentum wheels to the selected set of angular-velocity waveforms to realize a spacecraft attitude that corresponds to the commanded momentum vector without exciting the spacecraft resonance.

The method 100 recognizes that the momentum wheels of an over-determined attitude control system can rotate in accordance with an infinite number of combinations of angular-velocity waveforms that will realize a commanded momentum vector.

Figure 1:
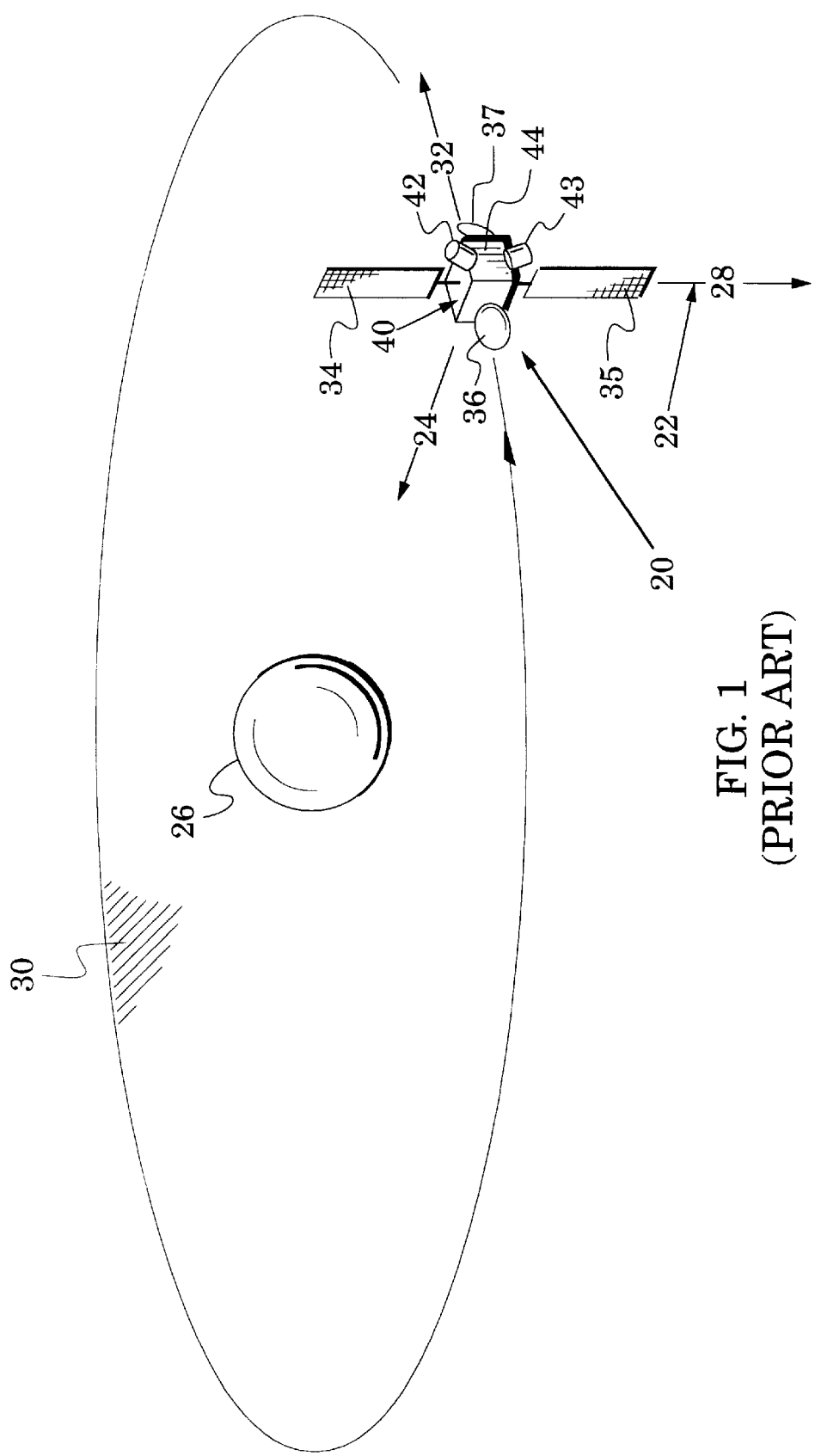
FIG. 1 is a perspective view of a spacecraft in an orbital plane about a celestial body.
Figure 3:
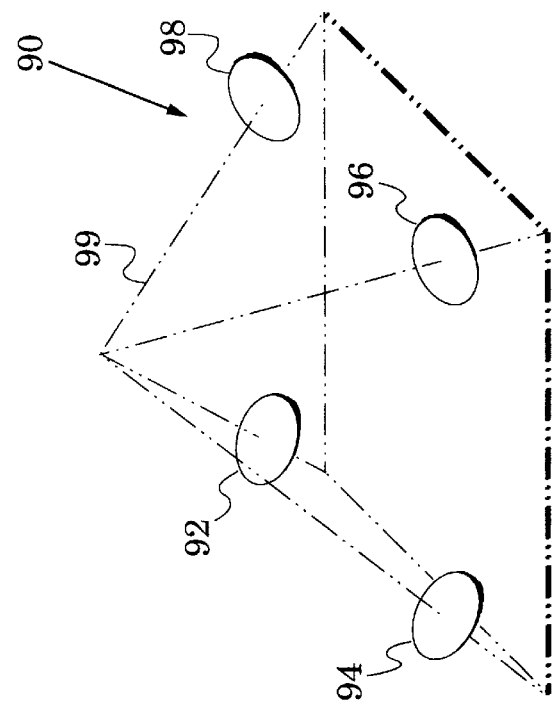
FIG. 3 is a perspective view of an exemplary over-determined torquing system for the spacecraft of FIG. 2.
Figure 2:
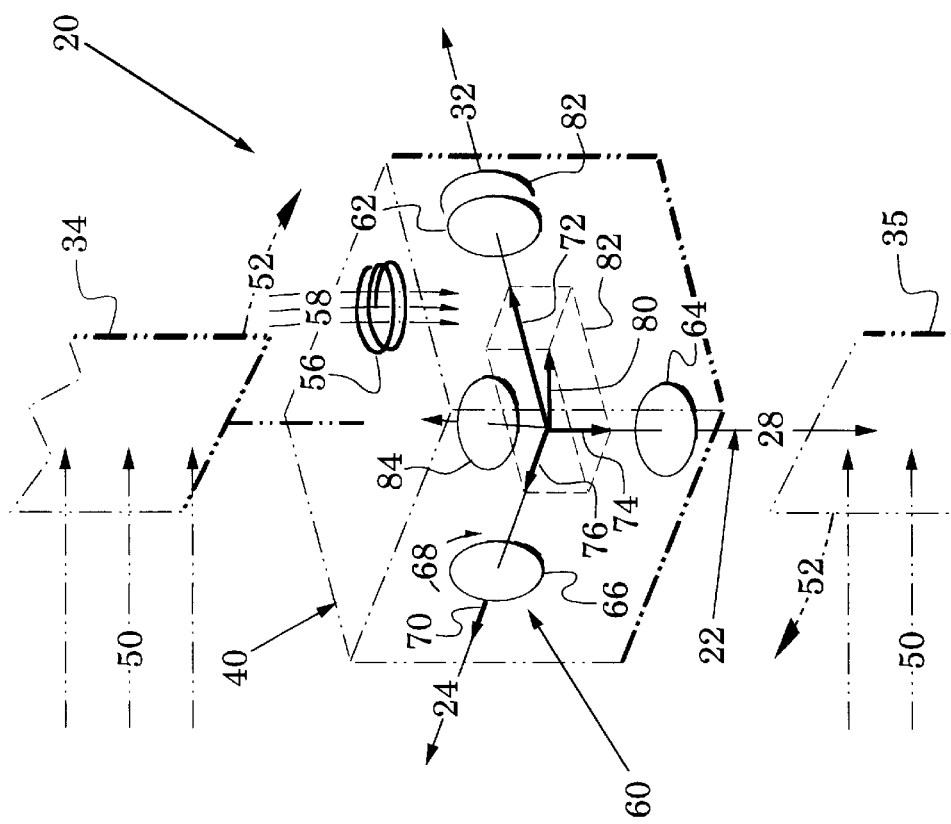
FIG. 2 is an enlarged view of the spacecraft of FIG. 1 which illustrates exemplary attitude-control structures.
Figure 5:
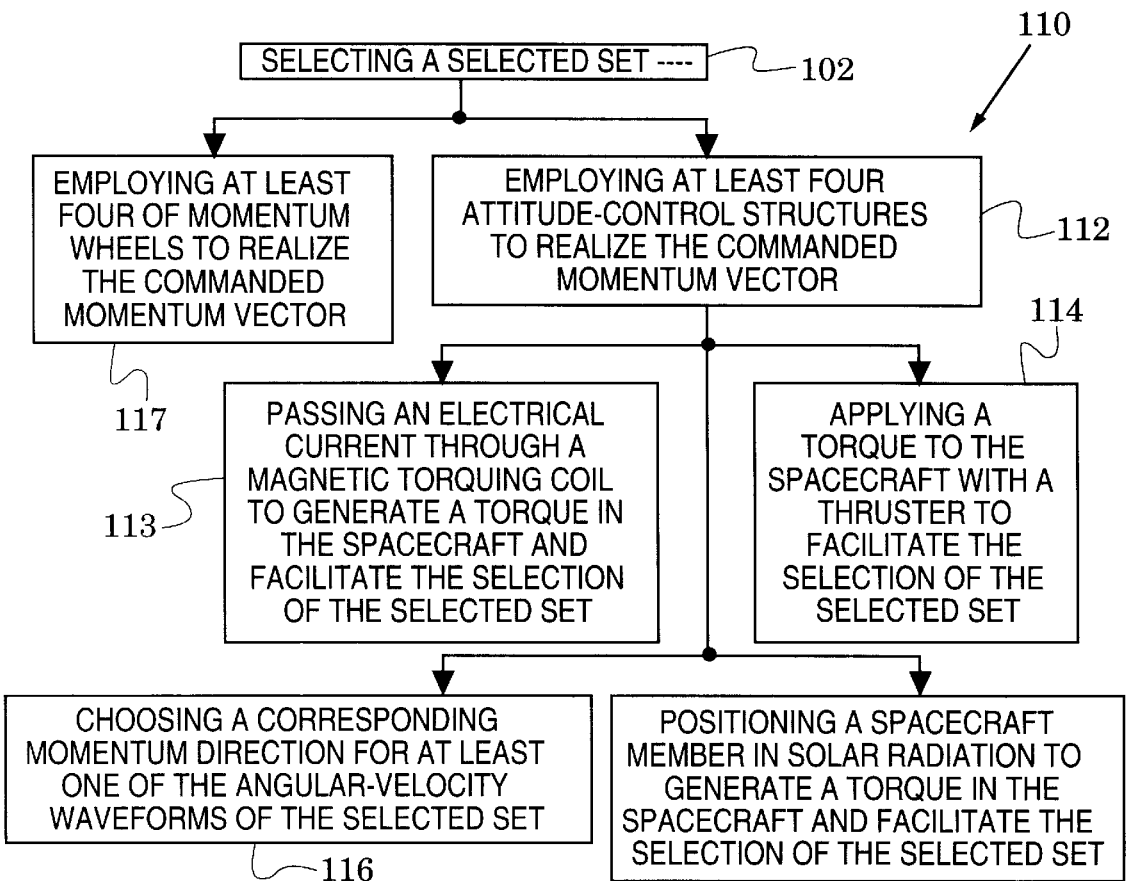
FIG. 5 is a flow chart which adds further process steps to the flow chart of FIG. 4.

In FIG. 5, accordingly, the selecting step 102 of FIG. 4 (repeated in abbreviated form in FIG. 5) includes the process step 112 of the flow chart 110 in which at least four attitude-control structures are employed as an over-determined attitude-control system to realize the commanded momentum vector. One of these structures can be a magnetic torquing coil (e.g., the coil 56 of FIG. 2). As recited in process step 113, an electrical current is passed through this coil so that a magnetic field of a celestial body generates a force upon the coil and, therefore, a torque on the spacecraft. Alternatively, a thruster torque is used in process step 114 to generate a torque on the spacecraft. In process step 115, a spacecraft member (e.g., the solar cell arrays 34 and 35 of FIG. 2) is positioned in a solar radiation to generate a torque on the spacecraft. In process step 116, an additional attitude-control structure is realized by the ability to select a selectable momentum direction, i.e., the use of a selectably oriented momentum wheel.

Any of these attitude-control structures can be mixed with momentum wheels to form at least four control structures which is the number required for an over-determined attitude-control system. For example, one of the attitude-control structures of process steps 113–116 can be combined with three momentum wheels to form an over-determined attitude-control system. Alternatively, four momentum wheels can be employed to form an over-determined attitude-control system as recited in process step 117 of FIG. 5.

Figure 6:
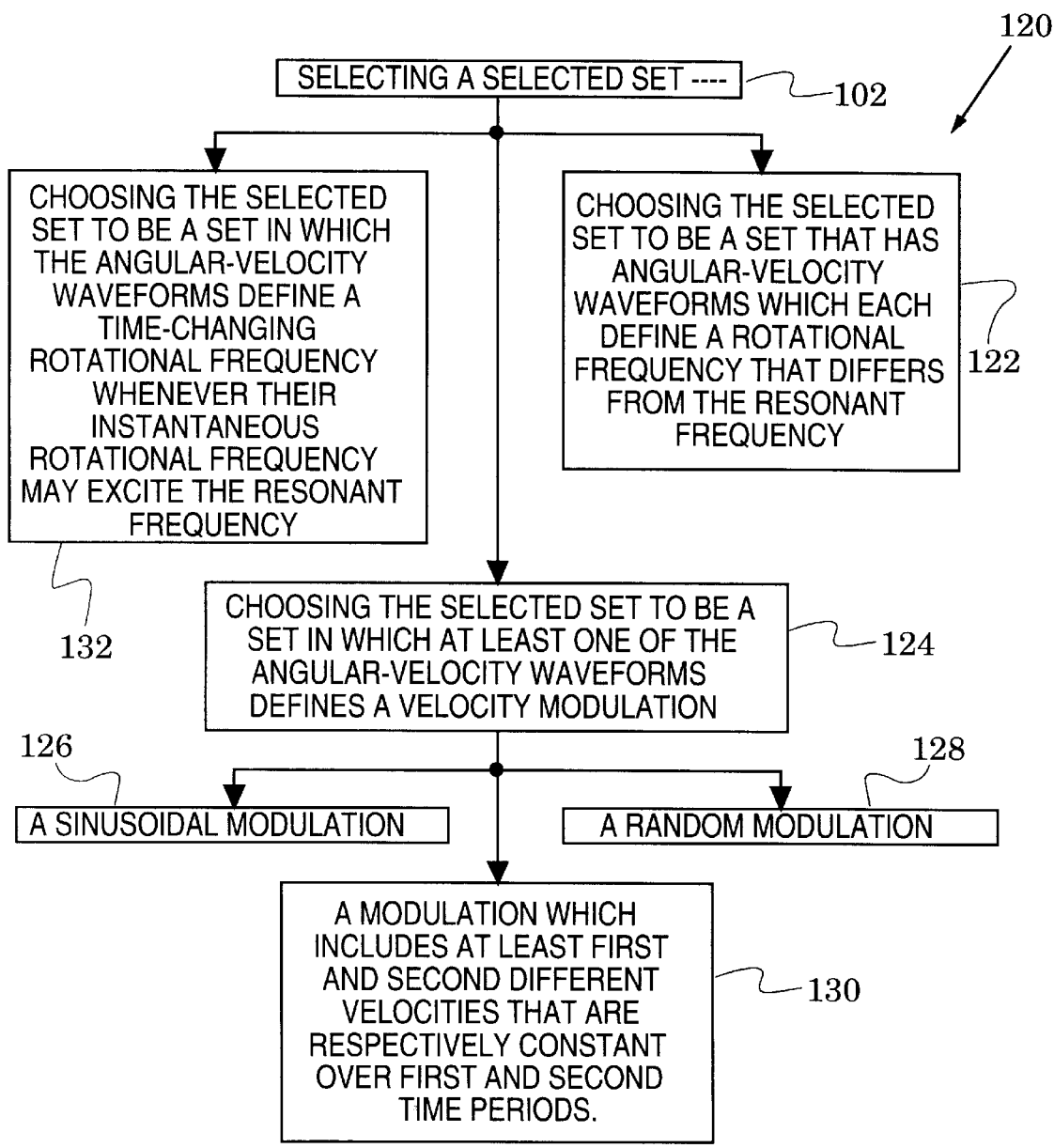
FIG. 6 is another flow chart which adds further process steps to the flow chart of FIG. 4.

The flow chart 120 of FIG. 6 shows that the selecting step 102 of FIG. 4 (repeated in abbreviated form in FIG. 6) can be realized in step 122 by choosing the selected set to be a set in which each angular-velocity waveform defines a constant rotational frequency that differs from the resonant frequency, i.e., all constant rotational frequencies are offset from the resonant frequency.

In process step 124 a velocity modulation is applied to prevent any angular-velocity waveform from dwelling at the resonant frequency. Exemplary velocity modulations are the sinusoidal modulation of process step 126, the random velocity modulation of process step 128 or the step modulation of process step 130 in which different constant velocities (none of which produce a rotational frequency equal to the resonant frequency) occur in any adjacent time periods.

As shown in process step 132, the teachings of the invention generally require that the selected set (of step 102 of FIG. 4) be a set in which each angular-velocity waveform defines a time-changing rotational frequency at any time that their instantaneous rotational frequency substantially equals the resonant frequency. Thus, no angular-velocity waveform is permitted to dwell at the resonant frequency and excite a spacecraft resonance.

In FIG. 6, a selected set of angular-velocity waveforms is chosen in accordance with the steps of flow chart 120 prior to their application to the momentum wheels (as in step 104 of FIG. 4). Alternatively, an initial set of angular-velocity waveforms can be applied to the momentum wheels and modified only if it is then sensed (with any conventional sensing apparatus such as an accelerometer) that a spacecraft structure is exhibiting excessive resonance.

This resonance is excited because one of the initial waveforms includes a rotational frequency that dwells at the resonant frequency. Accordingly, this waveform can be modified to a modified waveform in which the rotational frequency is chosen sufficiently different from the resonant frequency that it does not excite the spacecraft resonance. The remaining angular-velocity waveforms can then be revised to form, with the modified waveform, a revised set of angular-velocity waveforms which realize a spacecraft attitude that corresponds to the commanded momentum vector without exciting the resonance.

The velocity modulation of process step 124 is especially useful when spacecraft resonant frequencies are not known and it is not convenient to sense them. Velocity modulation of the angular-velocity waveforms insures that no disturbance torque will dwell at a spacecraft resonance.

The process steps of FIGS. 4–6 are specifically structured for realization with an over-determined attitude-control system. As shown in the flow chart 140 of FIG. 7, the teachings of the invention can also be practiced with a uniquely-determined attitude-control system. That is, the teachings of the invention can be carried out with three attitude-control structures (e.g., three momentum wheels or two momentum wheels and another attitude-control structure such as a magnetic torquing coil, a thruster or an apparatus that facilitates a selectable momentum direction).

Figure 7:
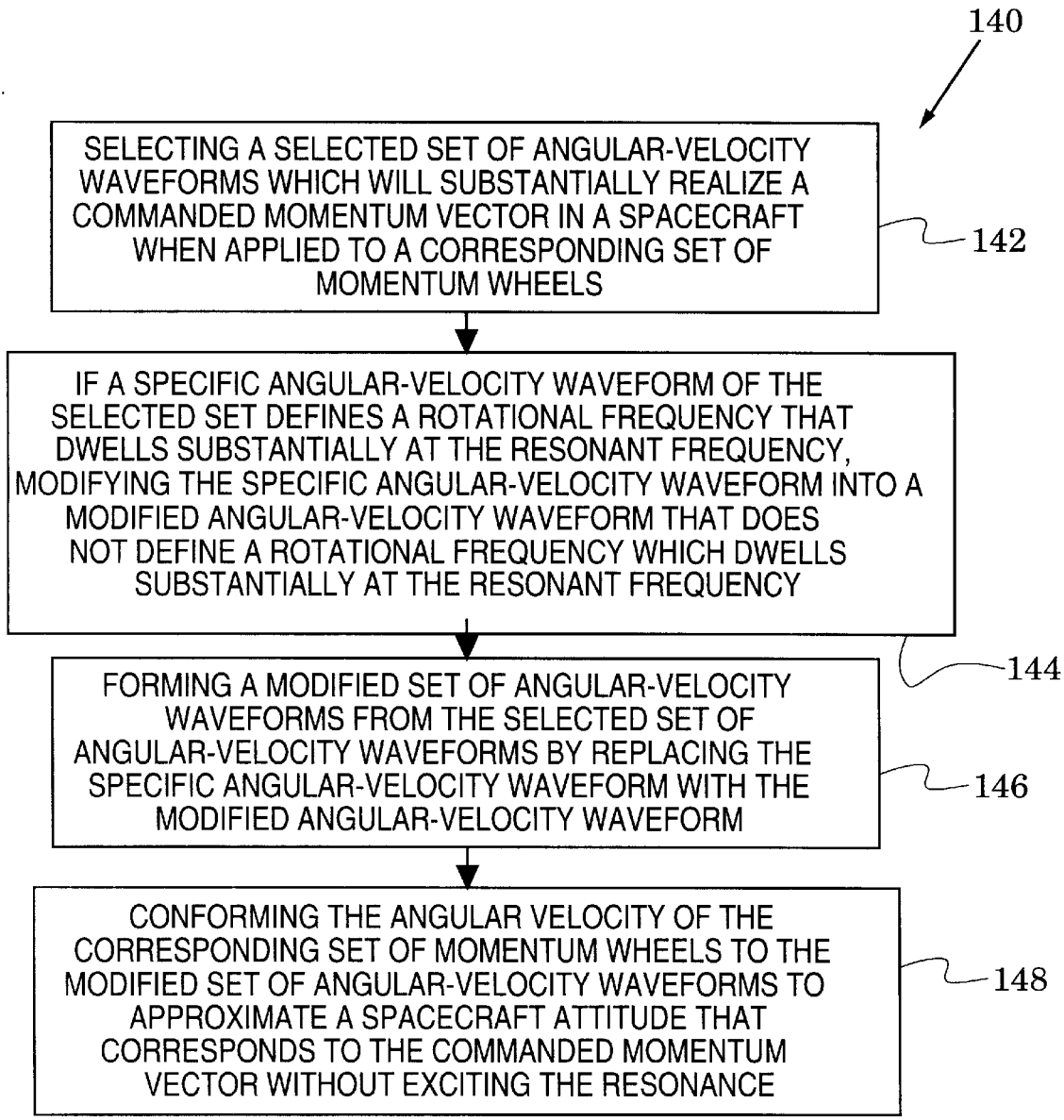
FIG. 7 is a flow chart which illustrates another attitude-control method.

In process step 142 of FIG. 7, a selected set of angular-velocity waveforms is selected which will substantially realize a commanded momentum vector in a spacecraft when applied to a corresponding set of momentum wheels. Process step 144 states that if a specific angular-velocity waveform of the selected set defines a rotational frequency that dwells substantially at the resonant frequency, it is modified to a modified angular-velocity waveform that does not define a rotational frequency that dwells substantially at the resonant frequency. This modification is carried out in processes similar to those specified in the process steps of FIG. 6, i.e., by offsetting a constant frequency, by applying a velocity modulation and, in general, defining a time-changing rotational frequency whenever an instantaneous frequency equals the resonant frequency.

Subsequently, a modified set of angular-velocity waveforms is formed in step 146 from the selected set of angular-velocity waveforms by replacing the specific angular-velocity waveform with the modified angular-velocity waveform. In process step 148, the angular velocity of the corresponding set of momentum wheels is then conformed to the modified set of angular-velocity waveforms to approximate a spacecraft attitude that corresponds to the commanded momentum vector without exciting the resonance.

In the processes of FIG. 7, the modified set of angular-velocity waveforms does not excite the spacecraft's resonance. Because these methods are practiced with a uniquely-determined attitude-control system, this can only be accomplished at the cost of approximating the commanded spacecraft attitude. That is, the resultant momentum vector can be positioned close to but not coincident with the commanded momentum vector. However, there are many spacecraft operating situations in which a predictable spacecraft pointing error is preferable to an unpredictable (and potentially larger) error caused by a resonance in a spacecraft structure.

The teachings of the invention facilitate the elimination or reduction of structural resonances in spacecraft that are excited by momentum wheel imperfections. These teachings are preferably practiced with an over-determined attitude-control system. Such systems are typically available (without added structures) because spacecraft often carry backup momentum wheels to insure against failure of primary momentum wheels. Alternatively, an over-determined attitude-control system can be formed with other typically-available attitude-control structures, e.g., a thruster.

As stated previously, the term "momentum wheel" is used herein to generically refer to any rotating-member structure (e.g., reaction wheel, momentum wheel and control moment gyroscope) in which at least one of its momentum and its momentum direction is selectable.

For simplicity, embodiments of the invention have generally been described with reference to a single excitation frequency and a single structural resonance. However, it should be understood that excitation structures (e.g., momentum wheels) typically exhibit a plurality of disturbance-torque frequencies and spacecraft structures typically exhibit a plurality of resonances.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of controlling the attitude of a spacecraft which has a resonance at a resonant frequency, said method employing an over-determined torquing system of attitude-control structures which include momentum wheels that each rotate in accordance with a selectable, respective angular-velocity waveform, said method comprising the steps of;

selecting a selected set from all sets of angular-velocity waveforms that substantially realize a commanded momentum vector in said spacecraft when applied to a corresponding set of said momentum wheels wherein none of the angular-velocity waveforms of said selected set dwell at said resonant frequency; and conforming the angular velocity of said corresponding set of momentum wheels to said selected set of angular-velocity waveforms to realize a spacecraft attitude that corresponds to said commanded momentum vector without exciting said resonance;

wherein said selecting step includes the step of choosing said selected set to be a set in which angular-velocity waveforms define a time-changing rotational frequency at any time that their instantaneous rotational frequency substantially equals said resonant frequency.

2. A method of controlling the attitude of a spacecraft which has a resonance at a resonant frequency, said method employing an over-determined torquing system of attitude-control structures which include momentum wheels that each rotate in accordance with a selectable, respective angular-velocity waveform, said method comprising the steps of:

selecting a selected set from all sets of angular-velocity waveforms that substantially realize a commanded momentum vector in said spacecraft when applied to a corresponding set of said momentum wheels wherein none of the angular-velocity waveforms of said selected set dwell at said resonant frequency; and conforming the angular velocity of said corresponding set of momentum wheels to said selected set of angular-velocity waveforms to realize a spacecraft attitude that corresponds to said commanded momentum vector without exciting said resonance;

wherein said selecting step includes the step of choosing said selected set to be a set in which at least one angular-velocity waveform defines a velocity modulation to avoid dwelling at said resonant frequency.

3. The method of claim 2, wherein said velocity modulation is a sinusoidal velocity modulation.

4. The method of claim 2, wherein said velocity modulation is a random velocity modulation.

5. The method of claim 2, wherein said velocity modulation includes at least first and second different velocities which are respectively constant over first and second time periods.

6. A method of controlling the attitude of a spacecraft which has a resonance at a resonant frequency, said method comprising the steps of:

providing an over-determined torquing system of attitude-control structures which include momentum wheels that each rotate in accordance with a selectable, respective angular-velocity waveform;

selecting a selected set from all sets of angular-velocity waveforms that substantially realize a commanded momentum vector in said spacecraft when applied to a corresponding set of said momentum wheels wherein all angular-velocity waveforms of said selected set are offset from said resonant frequency; and conforming the angular velocity of said corresponding set of momentum wheels to said selected set of angular-velocity waveforms to realize a spacecraft attitude that corresponds to said commanded momentum vector without exciting said resonance.

7. The method of claim 6, wherein said selecting step includes the step of choosing said selected set to be a set in which each angular-velocity waveform defines a constant rotational frequency that differs from said resonant frequency.

8. The method of claim 6, wherein said selecting step includes the step of employing at least four of said momentum wheels to realize said commanded momentum vector.

9. The method of claim 6, further including the step of employing at least four of said attitude-control structures to realize said commanded momentum vector.

10. The method of claim 9, wherein said employing step includes the step of applying a torque to said spacecraft with a thruster to facilitate the selection of said selected set.

11. The method of claim 9, wherein said employing step includes the step of passing an electrical current through a magnetic torquing coil to thereby generate a torque in said spacecraft and facilitate the selection of said selected set.

12. The method of claim 9, wherein said employing step includes the step of positioning a spacecraft member in solar radiation so as to generate a torque in said spacecraft and facilitate the selection of said selected set.

13. The method of claim 12, wherein said spacecraft member is a solar cell array.

14. The method of claim 6, wherein said selecting step includes the step of choosing a corresponding momentum direction for at least one of said angular-velocity waveforms of said selected set.

15. A method of controlling the attitude of a spacecraft which has a resonance at a resonant frequency, said method employing an over-determined torquing system of attitude-control structures which include momentum wheels that each rotate in accordance with a selectable, respective angular-velocity waveform, said method comprising the steps of:

selecting a selected set of angular-velocity waveforms which will substantially realize a commanded momentum vector in said spacecraft when applied to a corresponding set of said momentum wheels;

if any specific angular-velocity waveform of said selected set defines a rotational frequency that dwells at said resonant frequency, modifying said specific angular-velocity waveform into a modified angular-velocity waveform that does not define a rotational frequency that dwells at said resonant frequency;

revising the other angular-velocity waveforms of said selected set so that they and said modified angular-velocity waveform form a revised set of angular-velocity waveforms which will substantially realize said commanded momentum vector when applied to said corresponding set of said momentum wheels; and conforming the angular velocity of said corresponding set of momentum wheels to said revised set of angular-velocity waveforms to realize a spacecraft attitude that corresponds to said commanded momentum vector without exciting said resonance.

16. The method of claim 15, wherein said modifying step includes the step of adjusting said specific angular-velocity waveform to define a constant rotational frequency that differs from said resonant frequency.

17. The method of claim 15, wherein said modifying step includes the step of adjusting said specific angular-velocity waveform to define a velocity modulation that avoids dwelling at said resonant frequency.

18. The method of claim 15, wherein said modifying step includes the step of adjusting said specific angular-velocity waveform to define a time-changing rotational frequency at any time that its instantaneous rotational frequency substantially equals said resonant frequency.

19. The method of claim 15, wherein said selecting step includes the step of employing at least four of said momentum wheels to realize said commanded momentum vector.

20. The method of claim 15, further including the step of employing at least four of said attitude-control structures to realize said commanded momentum vector.

21. A method of controlling the attitude of a spacecraft which has a resonance at a resonant frequency, said method employing a torquing system of attitude-control structures which include momentum wheels that each rotate in accordance with a selectable, respective angular-velocity waveform, said method comprising the steps of:

selecting a selected set of angular-velocity waveforms which will substantially realize a commanded momentum vector in said spacecraft when applied to a corresponding set of said momentum wheels;

if a specific angular-velocity waveform of said selected set defines a rotational frequency that dwells substantially at said resonant frequency, modifying said specific angular-velocity waveform into a modified angular-velocity waveform that does not define a rotational frequency that dwells at said resonant frequency;

forming a modified set of angular-velocity waveforms from said selected set of angular-velocity waveforms by replacing said specific angular-velocity waveform with said modified angular-velocity waveform; and conforming the angular velocity of said corresponding set of momentum wheels to said modified set of angular-velocity waveforms to approximate a spacecraft attitude that corresponds to said commanded momentum vector without exciting said resonance.

22. The method of claim 21, wherein said modifying step includes the step of offsetting a constant rotational frequency of said specific angular-velocity waveform to form said modified angular-velocity waveform.

23. The method of claim 21, wherein said modifying step includes the step of applying a velocity modulation to said specific angular-velocity waveform to form said modified angular-velocity waveform.

24. The method of claim 23, wherein said velocity modulation is a sinusoidal velocity modulation.

25. The method of claim 23, wherein said velocity modulation is a random velocity modulation.

26. The method of claim 23, wherein said velocity modulation includes at least first and second different velocities which are respectively constant over first and second time periods.

27. The method of claim 21, wherein said modifying step includes the step of substituting a time-varying frequency for any frequency of said specific angular-velocity waveform that substantially equals said resonant frequency.

28. The method of claim 21, wherein said selecting step includes the step of choosing a corresponding momentum direction for each angular-velocity waveform of said selected set.

29. The method of claim 21, wherein said selecting step includes the step of employing no more than three of said momentum wheels to realize said commanded momentum vector.

30. The method of claim 21, further including the step of employing no more than three of said attitude-control structures to realize said modified momentum vector.

31. The method of claim 21, wherein said employing step includes the step of applying a torque to said spacecraft with a thruster to facilitate the realization of said selected set.

32. The method of claim 21, wherein said employing step includes the step of passing an electrical current through a magnetic torquing coil to thereby generate a torque in said spacecraft and facilitate the realization of said selected set.

33. The method of claim 21, wherein said employing step includes the step of positioning a spacecraft member in solar radiation so as to generate a torque in said spacecraft and facilitate the realization of said selected set.

34. The method of claim 21, wherein said spacecraft member is a solar cell array.

35. The method of claim 21, wherein said selecting step includes the step of choosing a corresponding momentum direction for at least one of said angular-velocity waveforms of said selected set.

* * * * *